(12) United States Patent
Makke et al.

(10) Patent No.: US 10,553,041 B2
(45) Date of Patent: Feb. 4, 2020

(54) METHOD AND APPARATUS FOR VEHICLE SYSTEM WEAR PREDICTION

(71) Applicant: FORD GLOBAL TECHNOLOGIES, LLC, Dearborn, MI (US)

(72) Inventors: Omar Makke, Lyon Township, MI (US); Oleg Yurievitch Gusikhin, Commerce Township, MI (US); Patrick Lawrence Jackson Van Hoecke, Westland, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 15/470,344

(22) Filed: Mar. 27, 2017

(65) Prior Publication Data

US 2018/0276905 A1 Sep. 27, 2018

(51) Int. Cl.
| | |
|---|---|
| G07C 5/00 | (2006.01) |
| G08C 17/02 | (2006.01) |
| G07C 5/08 | (2006.01) |
| H04W 4/80 | (2018.01) |

(52) U.S. Cl.
CPC .......... *G07C 5/008* (2013.01); *G07C 5/0808* (2013.01); *G08C 17/02* (2013.01); *G07C 5/0816* (2013.01); *H04W 4/80* (2018.02)

(58) Field of Classification Search
CPC .......... G07C 5/008; H04W 4/38; H04W 4/44; H04W 4/80; G60W 2050/046; G05B 23/02; B60W 2050/046

USPC ........................................ 701/29.4
See application file for complete search history.

(56) References Cited

U.S. PATENT DOCUMENTS

| | | | |
|---|---|---|---|
| 9,240,082 B2 | 1/2016 | Marathe et al. | |
| 9,846,978 B1* | 12/2017 | Tseng | G07C 5/006 |
| 2004/0034504 A1* | 2/2004 | Ulrich | F02D 41/22 |
| | | | 702/181 |
| 2009/0051364 A1* | 2/2009 | Ishida | H01M 10/48 |
| | | | 324/430 |
| 2012/0296512 A1 | 11/2012 | Lee et al. | |
| 2015/0094903 A1 | 4/2015 | Bell | |
| 2016/0163130 A1* | 6/2016 | Zagajac | G07C 5/0808 |
| | | | 701/29.1 |

\* cited by examiner

*Primary Examiner* — Krishnan Ramesh
(74) *Attorney, Agent, or Firm* — Michael Spenner; Brooks Kushman P.C.

(57) ABSTRACT

A system includes a processor configured to wirelessly receive first usage data in conjunction with a wear-state report, indicating a sensed level of system wear, from a plurality of vehicles. The processor is also configured to aggregate and analyze the first usage data to determine common parameters and corresponding values indicative of the sensed level of system wear. The processor is further configured to wirelessly receive second usage data from a vehicle lacking a sensor capable of sensing the sensed level of system wear. Also, the processor is configured to compare values of the common parameters in the second usage data to the determined values indicative of the sensed level of system wear and report a likely wear-state to the vehicle lacking the sensor, responsive to the comparison indicating a level of system wear similar to the sensed level of system wear.

6 Claims, 4 Drawing Sheets

METHOD AND APPARATUS FOR VEHICLE SYSTEM WEAR PREDICTION

TECHNICAL FIELD

The illustrative embodiments generally relate to methods and apparatuses for vehicle system wear prediction.

BACKGROUND

The ability to gather data from a large number of vehicles on the road makes a new level of analytics possible. Interested parties can gather traffic and weather, performance, road characteristics and all other sorts of data, aggregate the data and perform wide-scope analytics. Prior to the existence of telematics units, allowing on-demand and/or regular reporting, gathering this scale of data was a difficult task. Now, however, many vehicles can report data upon request, and with enough data predictions about many systems can be formulated and refined.

By observing various situations and driving states, many aggregated observed actualities can be aggregated to form a reasonable prediction about similar conditions under which a similar instance will again occur. For example, if 100,000 electric vehicles report a 0.2% drop in energy efficiency when temperature drops below 20 degrees, this data would be useful to determine that there is likely a cause-effect occurring, and the data would also be useful to other vehicles attempting to predict distance to empty under operating conditions below 20 degrees.

There is a wide variety of utility in crowdsourced data, and the illustrative embodiments demonstrate some examples of a useful concept achievable under such a model.

SUMMARY

In a first illustrative embodiment, a system includes a processor configured to wirelessly receive first usage data in conjunction with a wear-state report, indicating a sensed level of system wear, from a plurality of vehicles. The processor is also configured to aggregate and analyze the first usage data to determine common parameters and corresponding values indicative of the sensed level of system wear. The processor is further configured to wirelessly receive second usage data from a vehicle lacking a sensor capable of sensing the sensed level of system wear. Also, the processor is configured to compare values of the common parameters in the second usage data to the determined values indicative of the sensed level of system wear and report a likely wear-state to the vehicle lacking the sensor, responsive to the comparison indicating a level of system wear similar to the sensed level of system wear.

In a second illustrative embodiment, a computer-implemented method includes receiving part-related usage data, including aggregated usage of vehicle systems that cause wear on a first part, from a plurality of first vehicles, reported in conjunction with a sensor in each of the first vehicles reporting a measured wear-level of the first part. The method also includes analyzing the usage data to determine usage parameter values indicative of the wear-level. The method further includes determining whether a projected wear-level of a second part in a second vehicle has reached the measured wear-level of the first part, based on aggregated usage data received from the second vehicle compared to the usage parameter values. Also, the method includes alerting a second-vehicle driver when the projected wear-level reaches the wear-level.

In a third illustrative embodiment, a system includes a processor configured to aggregate and compare part-related vehicle system usage data, received from a plurality of first vehicles in conjunction with a vehicle sensor report indicating a measured part wear-level, to build a model of wear-causing factors. The processor is also configured to report projected part wear to a second vehicle, responsive to a determination that part-related vehicle system usage data received from the second vehicle and analyzed based on the model indicates the measured wear-level.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
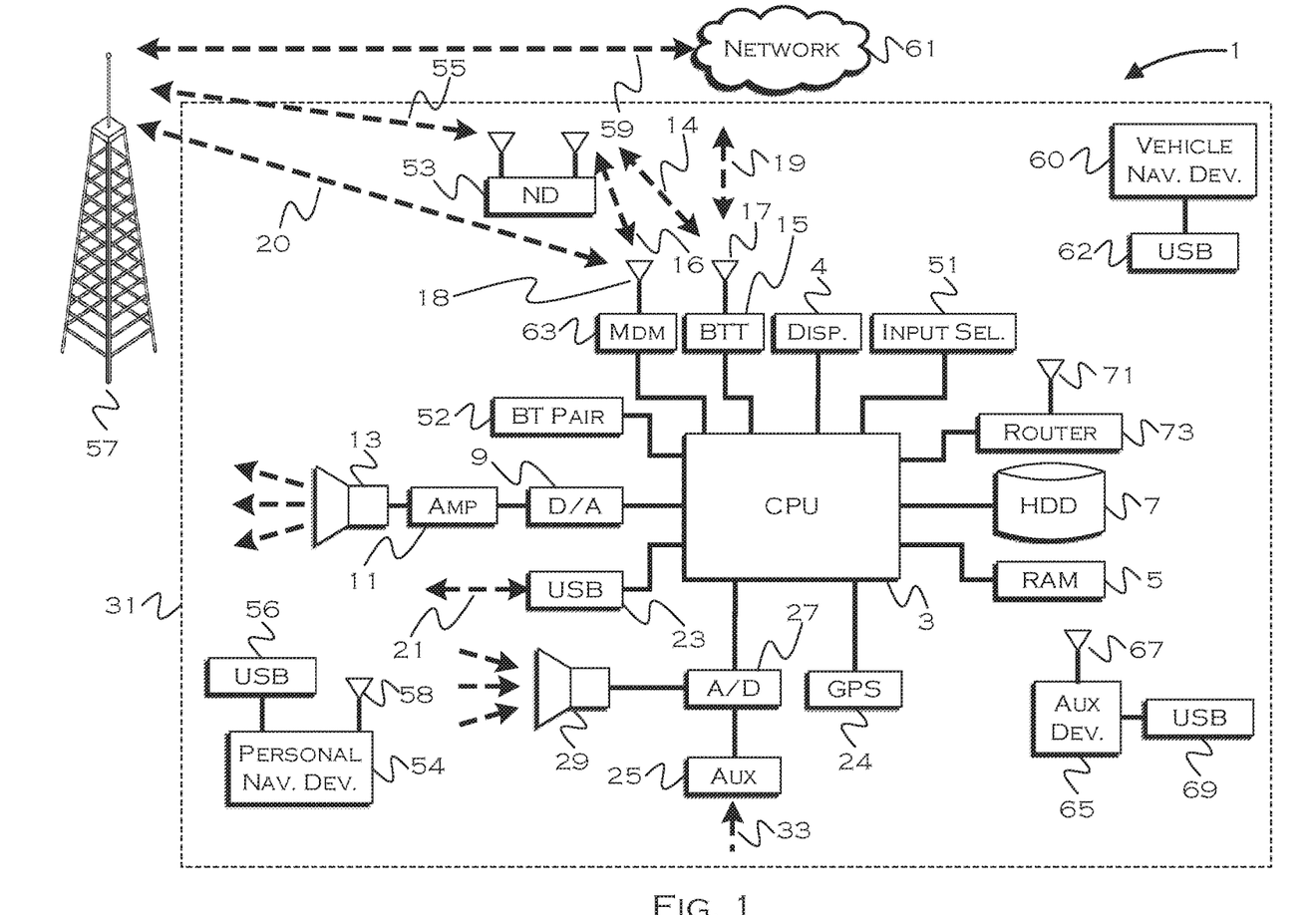
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLU- ETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Vehicles come equipped with a wide variety of sensors. The types and varieties of sensors can vary with vehicle age, model, current available technology, and original equipment manufacturer (OEM) specifications. For example, a high-end model of a vehicle may come equipped with a sensor that can detect brake wear (this is merely an illustrative example). A cheaper version of the same vehicle may not have the sensor available. Nor may an older model, because, for example, the sensor may represent newly developed technology.

Retrofitting sensors onto other vehicles that lack the sensors may be an expensive undertaking. Nonetheless, the data obtained by these sensors could be useful, so there is a challenge in delivering this information to customers who own a vehicle that lacks the useful sensors already installed.

Because the concept of crowd-sourcing data allows for large scale data gathering, wear-related data can be gathered from the vehicles that include the sensor. This data can be broad, specific and/or the requested data may be refined over time. For example, a first pass may include gathering data that relates to speed and braking energy (deceleration) whenever a brake is used. Then, when the vehicle sensor registers a certain level of wear, the aggregated data for that vehicle can give an approximation of the total amount of energy expended to wear the brakes to the sensed level.

Of course, there are a number of other wear-affecting conditions, but these can be modeled over time once a baseline expectation is in place. Thus, a second or third set of data gathering can relate to tracking additional conditions that may cause wear, and over time a very detailed analysis of what causes wear may be performed. Location data, weather data, windspeed, temperature, and a variety of other conditions can be tracked, so that when a prediction is made, it can be more and more accurate to the vehicle conditions for which the prediction was made.

With even a basic set of data (such as total energy expended in wearing down a brake pad to certain level), an OEM can provide useful predictions to vehicles lacking the appropriate sensing technology.

In the preceding example, whenever a new set of brake pads is installed, for example, or when a current brake state (X %) is known, the vehicle lacking the sensors can begin data gathering and reporting of energy used in braking. This data can be aggregated and compared to baseline expectations, so an OEM analytics process can predict when a vehicle may experience a certain level of brake wear. That is, once the reporting non-sensing vehicle reports the appropriate level of utilized braking force (as tracked over time), the system can predict that the expected level of wear is present. This essentially achieves a virtual sensing state, by gathering the data related to the cause of what is sensed and using the data to predict the same result, even in the absence of the actual sensor.

If wear is not linear, then knowing a current brake state (observable during maintenance for other reasons) may be useful if modeling can be done from a state of less than perfect down to a level of needed repair. This may require additional modeling, although ongoing data gathering at dealerships and service centers can help quickly refine this model. For example, if a customer vehicle (with or without sensors) experiences a certain level of wear between maintenance checks, that level of wear and the attendant data can be reported (by the dealer, by the vehicle, etc) and used for mid-cycle analytics.

The same concepts discussed with respect to braking can be applied to a variety of vehicle systems. Also, modeling can be used to determine which other vehicle models to which a certain system model can be applied. With regards to brake wear, vehicle mass, tire diameter and a variety of other specifications may come into play, so it may be the case that the data is only precisely useful for certain similarly equipped vehicles, and the data is loosely useful for other marginally similar vehicles (other SUVs, for example, if the baseline was taken from an SUV). With regards to fluid system breakdown, spark plug wear or other certain system wear, however, the model of the vehicle may play less of a role, and so modeling of certain system wear based on sensed data may be useful across a wide variety of vehicle models. Creating predictions and measuring actual results (i.e., when the maintenance is actually performed, was the prediction correct) will help refine the models and create an understanding of which system models have applicability to which vehicles.

Eventually, with sufficient refinement, an OEM could intentionally place a discrete number of particularly suited sensors in a delivered fleet (e.g., all the cars in a locality) and use the data gathered by those vehicles to provide virtual sensing equivalents to other vehicles in the fleet, which may lack the sensors. Once the model has been verified over a long period of time, so that causation is known, then the OEM could even omit the sensors entirely, relying instead on a carefully crafted model that has been repeatedly proven to have a high level of accuracy. Or the OEM could offer the sensors as an upgrade option, but the only practical difference to most customers would be that the system is predicting, instead of observing, a level of wear, and if the prediction were accurate enough, most customers would not likely mind the distinction.

Figure 2:
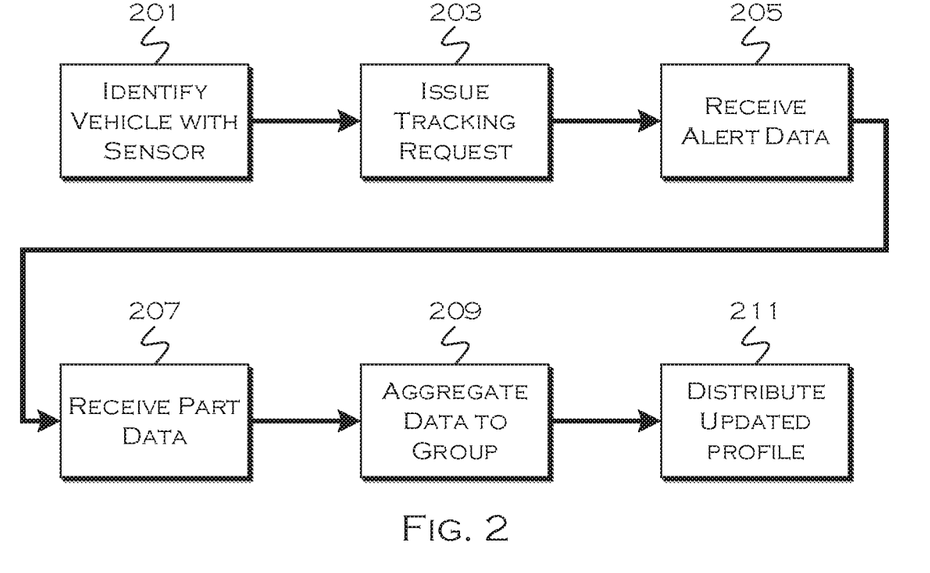
FIG. 2 shows an illustrative process for data tracking.

FIG. 2 shows an illustrative process for data tracking. In this example, the process will identify a certain set of vehicles with sensors and send specific requests for data to those vehicles. This allows OEMs to focus on gathering at least information that is suspected to be useful for determining a broader model. As noted before, this could initially begin with a gathering of, for example, braking energy (again, braking is used merely to illustrate the concept) and, later in time, this could request specific weight or environmental data, for example.

It is also possible to gather all conceivable data, but since the data is transferred to an OEM, gathering a discrete amount of targeted data may be more efficient and less data-transfer intensive. The desirability of one approach vs. the other approach may depend on, for example, size of data and ease of transfer. It is also the case that some variables may not even be initially known, so the concept shown in FIG. 2 even allows for updating of an "all data" concept, in that additional factors never even previously considered can be added to the data gathering approach in a dynamic manner.

This approach also allows for "theory testing" with regards to data sets. If a variable is expected to have an impact, the OEM can easily issue a dynamic gathering update to instruct appropriately equipped vehicles to gather data relating to the variable. Once sufficient data is gathered, the OEM can analyze the data and see if a meaningful conclusion can be drawn. If not, it is easy enough to simply instruct the object vehicles to cease gathering data relating to that particular variable.

In this example, the process identifies 201 a vehicle having a sensor that is capable of detecting a certain level of system wear or use. Examples include, but are not limited to, low fluid states, brake wear, shock wear, tire wear, etc. While any sensor could be considered, the focus is likely to be on vehicles that have sensors which are not widely provided to virtually every vehicle (such as a low-oil sensor). On the other hand, if certain vehicles had a much more detailed oil sensor, that sort of data could be useful for vehicles with a basic level sensor. For example, if one model of vehicle could detect a level of oil degradation and contaminants, and the variables causing this oil state were trackable, this information could be useful to other vehicles which might experience similar conditions (as represented by the variables), but which might lack the refined sensing capability.

The system then identifies one or more tracking-related variables that might be useful to determine system wear, and requests 203 that the identified vehicle begin tracking those variables. If no particulars are known, this request can be a request for broad data tracking, and may later be refined based on extracted state-affecting variables (extracted from models). The vehicle then gathers data for some time period (e.g., without limitation, until the vehicle sensor indicates an alert state) and then reports back the data.

The remote system receives 205 the data from the identified vehicle and all other vehicles similarly identified. The system also receives 207 part/system data, indicating part information or system information which may be useful in analyzing the results. For example, with regards to brakes, brake pads may have different compositions, and so data for a certain pad may not be particularly useful for a pad of a different composition. The same could be true for certain fluids, which may come in grades and types, and so deterioration of one grade may not be useful to determine deterioration of another.

The process aggregates 209 the received data with a larger set of data and then performs an analysis to see if any particular causes of wear can be identified or refined. This allows the system to profile variables expected to lead to wear, and the system can then distribute 211 an updated prediction profile to vehicles lacking the particular sensor, but which may include the part or system to which the prediction is applicable.

If the analysis for an individual vehicle (to determine a likely wear state) is done in the cloud (as opposed to on-board, for example), the process may use the updated model to remodel recent data and improve predictions with regards to incoming data. That is, if a model improvement is revealed by additional analysis, recently made predictions may be remodeled under the improved model, as well as modeling new predictions for newly reporting vehicles.

Figure 3:
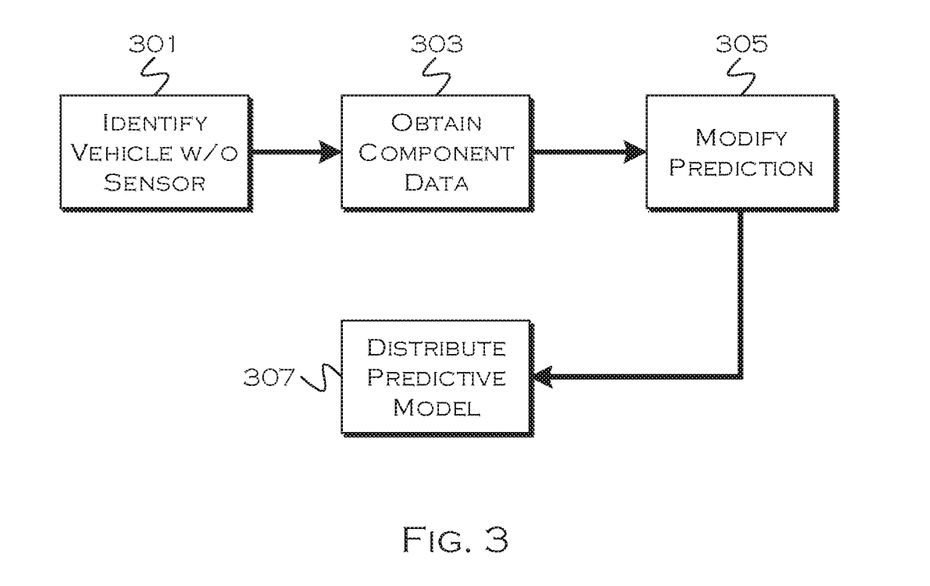
FIG. 3 shows an illustrative process for prediction utilization.

FIG. 3 shows an illustrative process for prediction utilization. In this example, the models produced by the analysis of large data sets are used to predict system wear states for vehicles that report usage data. In this example, the system produces predictions or guidelines for non-sensing vehicles, which the system can use or deliver to the vehicles so that a driver of a non-sensing vehicle can be alerted to a likely wear state.

In this example, the process has access to vehicle data for a large number of fleet vehicles on the road (each time a customer buys a vehicle, for example, it may be registered). For each vehicle without sensing capability 301, the process may obtain 303 configuration data, relating to parts/components, fluids, etc., relating to that vehicle. The system may use this data to determine which models to apply to the non-sensing vehicle (e.g., certain brake pad types, certain lighting features, etc.).

A predictive set of variables may be obtained for the particular vehicle 305. For example, utilization parameters may be determined 305 and aggregated for the particular vehicle. These parameters can be used by a cloud analysis or an on-board analysis to determine a wear state for the particular vehicle. If the vehicle (or a mobile device, for example) will be self-analyzing, the process can deliver 307 the variable values indicating wear to the vehicle. If the cloud performs the analysis, the process can store the model values with respect to a vehicle profile, for example.

If the vehicle is performing the analysis, the vehicle can receive a set of aggregate wear values from the model (cloud). Once vehicle usage data meets the parameter values, the vehicle can issue an alert about a likely wear state. If the model is updated over time, the remote cloud system can deliver the updated values to the vehicle. In another model, the cloud can perform analysis as the vehicle delivers data, the analysis being based on a most-recent updated predictive model. The vehicle-based analysis has the advantage of not requiring connectivity at the time of alert, provided that the variable values are delivered at a prior point. The cloud model has the advantage of usually being faster, and always having access to updated model data. Which point is used for analysis (vehicle, cloud, phone) is a matter of choice, weighing the benefits against the downsides.

Figure 4:
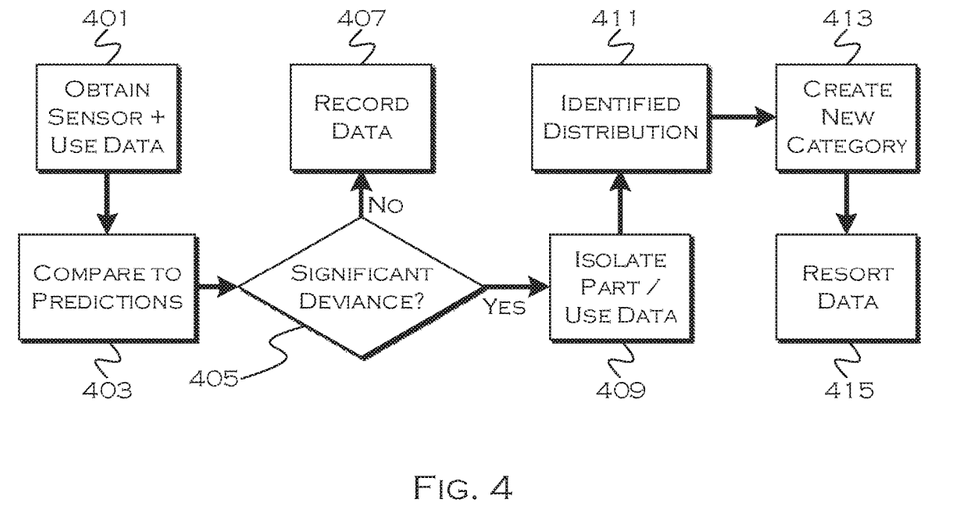
FIG. 4 shows an illustrative process for data analysis.

FIG. 4 shows an illustrative process for data analysis. In this example, the process obtains (receives) 401 vehicle data. In this example, vehicles report data when a particular sensor indicates a wear state, but the vehicle could also report data over time, to demonstrate what levels of usage do not yet trigger the wear state.

The process, in this example, receives the values about usage data, and the sensor trigger, and compares 403 the received values to known predictions about when the sensor trigger should have occurred. This will reveal if the predictive model is accurate for the current vehicle data or not. If there is no significant deviance 405 (if the considered data is within a predefined tolerance of what the data is expected to be), the process will aggregate 407 the data to the pool, reinforcing the current model.

If there is an unexpected deviance, the process may isolate 409 the one or more data values or part data that is not in lock-step with the current predicted model. That is, the process could identify that the data values were high for wear, but this could be because of a different composite in the brake pad. If the brake pad values were consistent, a different variable may be atypical, and through comparison to various models the process can isolate 409 the likely distinctions.

Once the process has identified 411 the distinction, the process may create 413 a new category. This could be a new category of part or system (representing a different composition) or a new category of data to track. In one example, the process may record such outliers until an aggregate number of corresponding outliers indicates that a likely new category should be created. The process then re-sorts 415 the data already gathered, in case data aggregated with respect to the old categorization/predictive model should be considered with regards to the new model instead.

For example, the process may receive data on brake usage, aggregating all of the data as one unit, but, over time, it may be revealed that a certain brake pad wears more slowly than another brake pad. Once vehicles have reported sufficient data to draw this conclusion, the process can isolate previously received data that corresponds to each brake pad type (assuming this is stored) and distribute the data according to brake pad type. This should result in two new predictions, each tailored to the various brake pad types and providing better modeling than an aggregate model of all data treating all brake pads as equals. If there are only 2% of the vehicles on the road having the "better" brake pad, it could take some time to make this distinction, and in the interim it may be better to use the general aggregate estimates for all vehicles, as opposed to having to wait until the distinction is actually made in the models.

Figure 5:
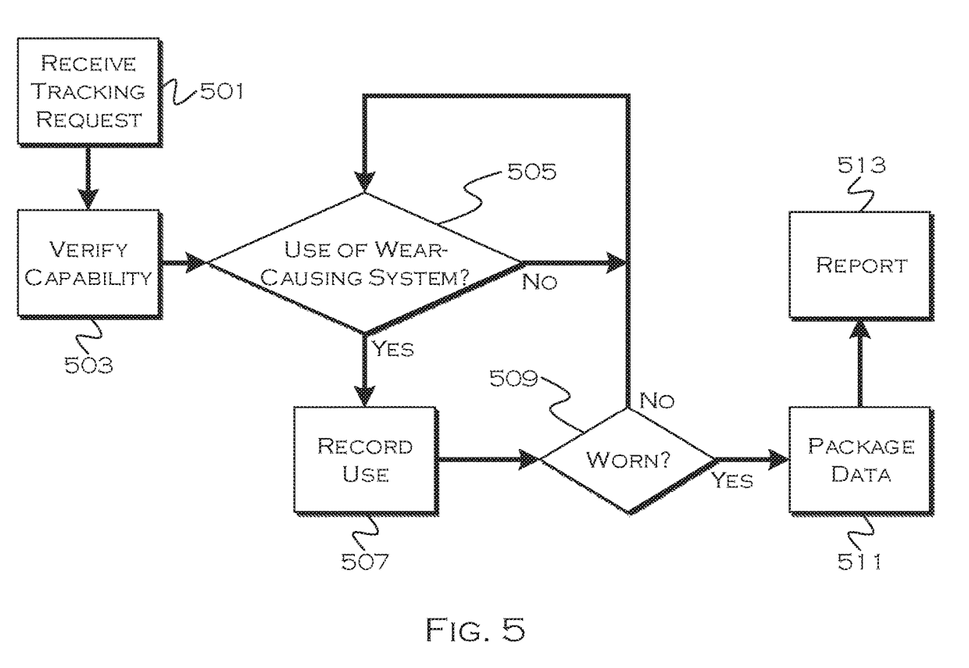
FIG. 5 shows an illustrative process for data reporting.

FIG. 5 shows an illustrative process for data reporting. In this example, the process on-board a vehicle receives 501 a tracking request from the remote system, indicating a particular usage parameter (or other parameter, e.g., environmental) to be tracked. In this example, the tracking request also includes identification of a corresponding sensor, which will be used as the basis for reporting the data. The vehicle verifies 503 that the corresponding sensor exists and that the vehicle is capable of tracking the requested parameter.

Each time the system being sensed by the sensor is used 505, the process records 507 the usage and the attendant data as identified by the request. There may be a baseline set of data that the process always records, and individual requests may add to that data based on newly identified variables of interest. Also, the process checks 509 the wear-sensor to determine if the system has reached an alert point. While described as a wear-sensor, the sensor is any sensor that can detect a deterioration of a vehicle system. As previously noted, it is often, although not necessarily, a sensor that is only provided to a subset of vehicles on the road.

If the vehicle sensor indicates that a wear state is present, the process will package 511 the usage data gathered over time and send 513 the usage data to the remote system. This can also include sending part, system, or fluid data (model or mfg identifier, parameters, etc.) and any other data deemed to be useful in modeling wear on vehicles having similar parts/components, systems, fluid usage, etc. but lacking the wear sensor.

Figure 6:
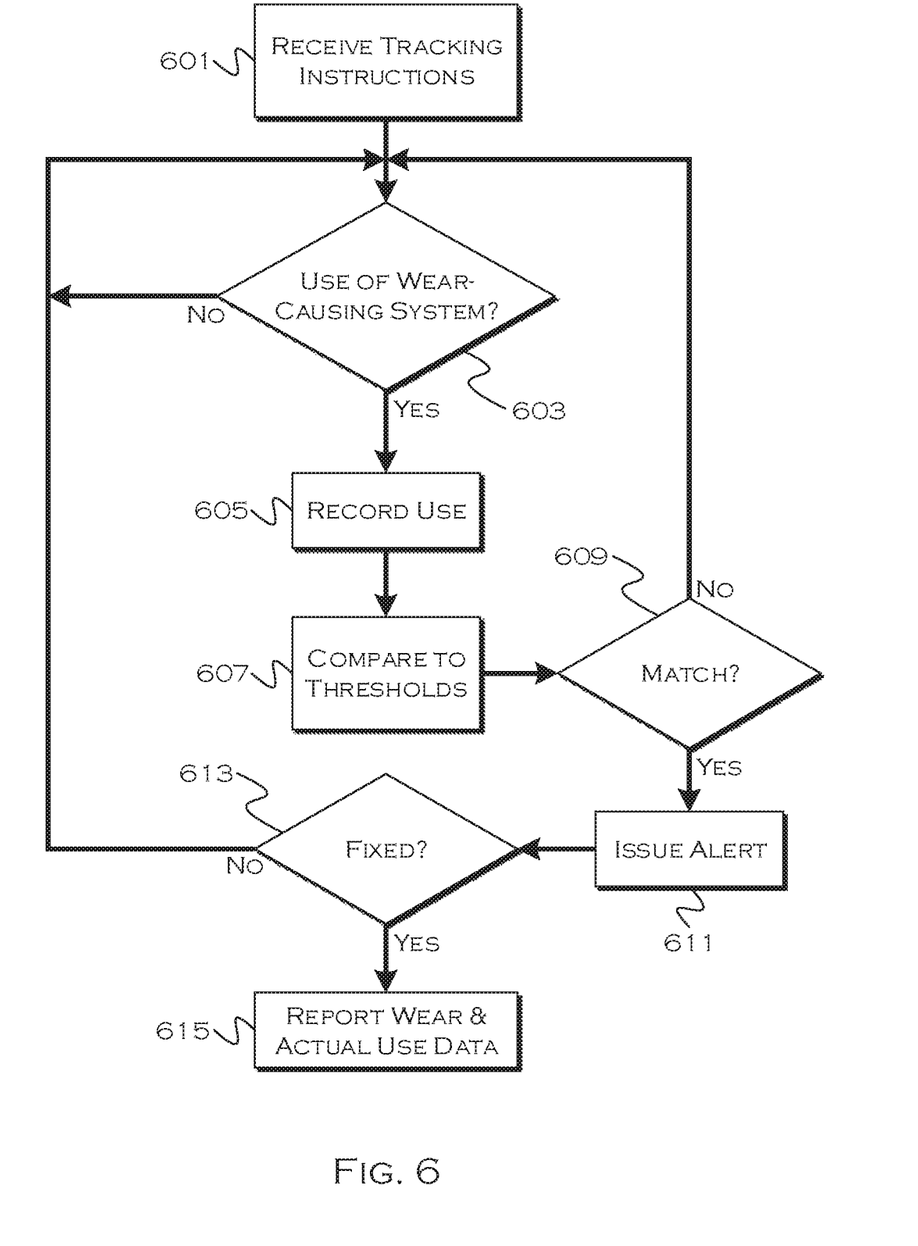
FIG. 6 shows an illustrative process for wear tracking and alerting.

FIG. 6 shows an illustrative process for wear tracking and alerting. In this example, the process runs on-board a non-sensing vehicle or a device associated with a non-sensing vehicle (e.g., passenger mobile device). The process here also receives 601 tracking instructions, although in this case the tracking is used to identify possible problems, since a sensor is not present.

Each time the system to be tracked is used 603, the process will record 605 the use of the system. The process also records the variable values related to identified wear-causing aspects of usage, and will likely aggregate these values in most cases. The process then compares 607 the aggregated values to thresholds identified in the tracking instructions, the thresholds indicating usage-totals that are likely to result in sufficient wear to trigger an alert. If a threshold is met 609, the process can issue 611 an alert to the driver (and to a remote system, for tracking purposes).

At some point, either due to excessive wear and breakdown or in a preventative manner, the system in question will be fixed 613. At that point in time, the vehicle or a dealer/service system can report 615 the actual wear-state and any aggregate usage data. This data can be analyzed by the remote system to see how effective the predictive model was. Improvements to the predictive model can thus be made in this manner as well.

Through the use of the illustrative embodiments, predictive wear models can be developed and utilized to provide virtual sensor equivalents to vehicles lacking actual wear sensors for certain components, parts, systems and fluids. With enough data and modeling, the predictive model can closely approximate warning conditions similar to those under which an actual sensor would generate a warning.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A computer-implemented method comprising:
    identifying a plurality of first vehicles having a sensor capable of measuring wear level of a first part;
    requesting measured wear level and part-related usage data, the request identifying a plurality of vehicle systems predefined as causing wear on the first part, from each of the plurality of first vehicles;
    receiving, responsive to the request, the part-related usage data, including aggregated usage of vehicle systems that were included in the request as predefined as causing wear on the first part, from the plurality of first vehicles, reported in conjunction with the sensor in each of the first vehicles reporting the measured wear-level of the first part, the wear-level measured by the sensor;
    analyzing the usage data to determine usage parameter values, representing the aggregated usage, indicative of the measured wear-level;
    determining whether a projected wear-level of a second part in a second vehicle, lacking the sensor and attendant capability to measure wear-level, has reached the measured wear-level of the first part, based on aggregated usage data received from the second vehicle compared to the usage parameter values; and
    alerting a second-vehicle driver when the projected wear-level reaches the measured wear-level.

2. The method of claim 1, wherein the system wear relates to a mechanical system part.

3. The method of claim 1, wherein the system wear relates to an electrical system part.

4. The method of claim 1, further comprising:
instructing the plurality of first vehicles to gather usage data of a specified type; and
instructing the plurality of first vehicles to report the gathered usage data when reporting the measured wear-level of the part.

5. The method of claim 1, further comprising:
determining that the second vehicle lacks the sensor; and
sending the usage parameter values to the second vehicle, along with an instruction to alert the driver if aggregated usage of the vehicle systems in the second vehicle reaches a level equal to the usage parameter values.

6. A computer-implemented method comprising:
receiving part-related usage data, including aggregated usage of vehicle systems that cause wear on a first part including a fluid characteristic, from a plurality of first vehicles, reported in conjunction with a sensor in each of the first vehicles reporting a measured wear-level of the first part including the fluid characteristic;
analyzing the usage data to determine usage parameter values indicative of the measured wear-level including the fluid characteristic;
determining whether a projected wear-level, including the fluid characteristic, of a second part in a second vehicle has reached the measured wear-level of the first part including the fluid characteristic, based on aggregated usage data received from the second vehicle compared to the usage parameter values; and
alerting a second-vehicle driver when the projected wear-level including the fluid characteristic reaches the measured wear-level including the fluid characteristic.

* * * * *